Patented Feb. 25, 1936

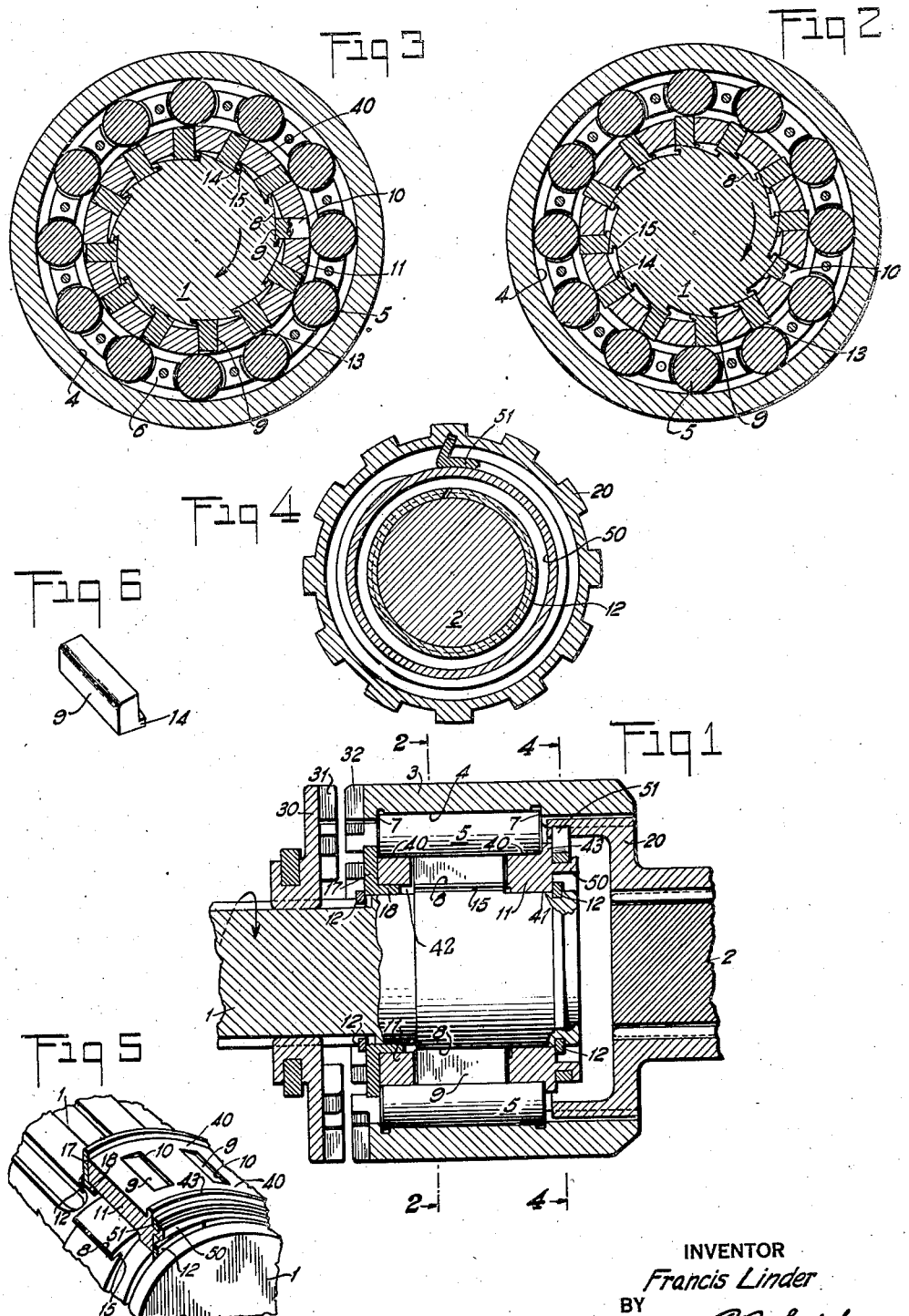

2,031,783

UNITED STATES PATENT OFFICE 2,031,783

DRIVING MECHANISM

Francis Linder, East Orange, N. J., assignor to Eclipse Aviation Corporation, East Orange, N. J., a corporation of New Jersey Application July 30, 1931, Serial No. 554,088

18 Claims. (Cl. 192—45)

This invention relates to clutches of the class frequently called "overrunning clutches" which provide an automatically releasable driving connection between relatively-revoluble members.

One of the objects of the invention is to provide positive, releasable, connection between the driving and driven members (usually shafts) through the agency of rollers, while avoiding or preventing frictional or sliding engagement of the rollers with each other or with the other elements of the structure, such as frequently occurs in devices of this class, and tends to cause wear and "flat" areas on the rollers.

Another object of the invention is to provide for or compel true rolling movement of the rollers comparable to that in the roller bearing while the clutch is in its free or overrunning condition.

A further object of the invention is to utilize the roller clutch as an anti-friction bearing relatively supporting the driving and driven members while they rotate relatively in one direction.

Still another object of the invention is to provide a large number of locking-rolls in proportion to the radial dimension of the clutch, and in other ways to increase the efficiency or certainty of action, and durability of these devices.

These and other objects of the invention will become apparent upon consideration of the following specification, when read with reference to the accompanying drawing wherein is illustrated the preferred embodiment of the invention. It is to be expressly understood, however, that the drawing is for the purpose of illustration only, and is not designed as a definition of the limits of the invention, reference being had for this purpose to the appended claims.

In the drawing,

Fig. 1 is a longitudinal section of a clutch structure, embodying the invention in one form;

Fig. 2 is a transverse section, along line 2—2 of Fig. 1, showing the roller clutch in active, or driving condition;

Fig. 3 is a similar section, showing the parts in unlocked, overrunning, or free-wheeling position;

Fig. 4 is a transverse section taken along line 4—4 of Fig. 1;

Fig. 5 is a fragmentary perspective view of certain details; and

Fig. 6 is a perspective view of a detail.

The mechanism will be described as functioning in the power-transmission line of a motor vehicle as a free-wheeling device, which will also enable its utility and operation in other uses or adaptations to be readily understood by skilled persons.

As used in a motor vehicle, the shaft 1, identified for the present as the driving member, is connected to or may actually be the rearward portion of the driven shaft of the change-speed gearing, when the free-wheeling device is placed at the rear of the gear-box, or it may be the rear end of the driven shaft of the main clutch when the device is placed between the clutch and gear-box. In the former instances, the shaft during forward driving will always rotate in the clockwise direction as viewed from the front of the vehicle (or from the left of Fig. 1) and as also indicated by arrows in the drawing; and in the latter instance, that is, when located between the clutch and the change-speed gearing, this shaft always rotates in the right-hand or clockwise direction during either forward or backward driving, in accordance with standard motor vehicle practice. The driven shaft 2 is in axial alignment with the driving shaft and is independently revolubly mounted in any suitable way, details of bearing arrangements being immaterial. This driven shaft is connected either through the gear-box or more directly, with or without a universal joint, to the Cardan or propeller shaft, which in turn drives the vehicle wheels in the usual manner.

While shaft 1 is referred to as the driving, and shaft 2 as the driven, shaft, these terms and the functions of the shafts are usually interchangeable, since by proper designing with due regard to directions of rotation and other considerations, either one may be the driver, and therefore different parts of the roller and positive clutch devices may be assembled on either one of the shafts. Further reference will not be made to such changes or variations, which may readily be understood by skilled persons.

In the present instance, shaft 1, being considered the driving shaft, extends within a drum or sleeve 3, which is keyed or otherwise suitably connected to the driven shaft 2. This sleeve has an inner cylindrical race surface 4 for a series of rollers 5, which are maintained in the desired spaced relation by a cage 6 which may be in accordance with standard roller bearing practice. These rollers are held against endwise displacement by annular shoulders 7 at opposite ends of the race surface. While the race 4 is an inner surface in respect to sleeve 3 in which it is formed or located, it is an outer race and locking surface in relation to the rollers. Shaft 1 has an annular series of cam element, or cam faces, 8, corresponding in number to the number of rollers 5. As shown by way of preference, these cam faces are formed on the shaft. These cam faces, which preferably are of arcuate or cylindrical contour, cooperate with the inward ends of substantially radially-acting locking members 9, otherwise referred to as wedging elements, of number also corresponding to the number of rollers. These are spaced and guided in approximately radial slots or socket formations 10 in a generally cylindrical cage or spacer ring 11, which is revoluble about or upon shaft 1 and is restrained against end motion thereon as by snap rings 12, engaged in annular channels in the shaft.

The cage, or wedge-spacer 11, desirably is of such length that it extends beyond the ends of guide slots 10 in each direction, in order to provide on the outer, cylindrical face of the spacer sleeve, suitable roller race-surface (which with respect to the rollers is the inner race, complemental to the race 4 in the driven drum). This race-surface includes circular end-zones 40 of uninterrupted cylindrical contour, with which end-portions of the cylindrical roller surfaces engage; so that while the intermediate portions of the roller surfaces pass over the outer ends of the wedge-guiding apertures of the cage, any bumping on the aperture-edges is prevented.

For convenience, in practicability of assembly, especially when, as shown, the cams 8 are cut integrally in the shaft, and project outward from the main shaft surface, the wedge-spacer sleeve has at one end a bore 41 of diameter providing a running fit on the shaft, and from this a counterbore 42 extends to the other end of the sleeve, this counterbore being of radius slightly greater than that of the cam-crests; thus permitting the sleeve to be slipped over the cams in one direction. The counterbored end of the sleeve is revolubly supported on the shaft by a separate end plate 17 having a circular lip or shoulder 18 fitting into the counterbore. Plate 17 may be connected in any suitable way, to rotate with the spacer sleeve 11.

Ribs or shallow flanges are preferably provided at the ends of the inner race surface, cooperating with ends of the rollers to limit or prevent relative end motion. One of these flanges 43 is formed in the sleeve 11, and at the other end of the race-surface, the projecting margin of plate 17 acts as a thrust-flange.

The outer end faces 13 of the wedge members 9 are of cam, angular or wedge form, extending angularly slightly outward in the rearward direction (with respect to the normal direction of rotation as indicated by the arrows) to exert a wedging or locking action on the rollers 5. The inward ends of these wedge members have a curvature conforming to that of the cam faces 8.

To provide for retention of the wedge pieces in inward position in certain cases, they desirably have at their inward and forward edges (also with respect to the normal direction of rotation) shallow flanges or ribs 14 to engage in complemental channels or undercuts 15 at the roots of the radial or shoulder portions of the cam formations.

Whenever the driving shaft 1 tends to turn in the indicated (right-hand) direction while the driven shaft 2 is stationary or tends to turn in the same direction at a slower speed, the inertia of the ring or wedge spacer sleeve 11, or the drag effect imparted to it by the rollers 5, causes the ring to lag or slip revolubly rearward with relation to the shaft, carrying the wedge members in the same relative direction, and in this movement the cam faces 8 act on the wedge members to move them outwardly to the position shown in Fig. 2, wherein their angular or locking faces 13 project outward from the cylindrical or race surface of sleeve 11 and engage simultaneously with inward faces of the respective rollers on lines adjacent the normal lines of roller contact with the sleeve surface, but angularly offset; thus producing a powerful wedging action upon the rollers and clamping the rollers between them and the outer race surface 4. The forward rolling tendency thus exerted on the rollers by the wedges jams the rollers between the cylindrical race surface 4 and angular wedge faces, thus practically positively locking the driving to the driven member. Whenever the driving shaft is retarded, or for any other reason the driven shaft tends to run at a higher relative speed in the indicated direction, the first effect is to cause forward movement and rotation of all the rollers about their own axes, the rollers in effect rolling off of the wedging faces and engaging the cylindrical race surfaces 40 of sleeve 11 and rolling thereon and on the outer race surface 4 in a normal, roller-bearing fashion. After a slight forward movement, the rollers encounter the projecting ends of the nearest adjacent wedging members and by rolling or pushing action move them and cage 11 rotarily forward clockwise, in relation to shaft 1 and the cams, whereupon the wedging members move or are pushed inward by the rollers as their inner end-faces slide along the inwardly sloping cam faces 8, and finally the retaining ribs or flanges 14 of the wedge members are seated in the undercuts or channels 15 in the roots of the cams and are thus restrained against outward displacement by centrifugal force.

The driven member is thus freed from the driving member and will run freely faster than the driving member, thus providing, for example, in a motor vehicle adaptation for free-wheeling or coasting of the vehicle under momentum, or by force of gravity on a down-grade, while the engine runs at a slower relative speed. During this free-wheeling or overrunning movement of the driven member, the rollers rotate with a true rolling action between the inner and outer races, consisting of the outer surface of sleeve 11 and the race surface 4 of sleeve 3, without any tendency to stick or to remain in relatively non-rotative positions or condition as frequently occurs in roller clutches of this general class, and which, by such non-rotary or sliding movement, wear in such a manner as to cause flat spots or areas which interfere with proper locking action, and are subject to other difficulties or disadvantages, as well understood by persons skilled in the art without further explanation.

If in certain cases there is a tendency toward uncertain locking or unlocking action, caused by failure of the wedge spacing sleeve 11 to rotate in relation to shaft 1, this difficulty may be overcome and positive locking and unlocking insured, by applying a moderate frictional drag between shaft 2, or its sleeve 3, or drum 20, and sleeve 11. Such drag means is sufficiently exemplified in Fig. 1, wherein 50 is a friction member or ring constituting an integral extension of one end of sleeve 11 and connected to sleeve 3 or its supporting member 20 on shaft 2 by a resilient friction band or spring 51. By this means, whenever the driven shaft tends to run faster or slower than the driving shaft, the element 50 frictionally urges the wedge spacing sleeve 11 to rotate in the corresponding direction in relation to shaft 1, and so practically insures the desired movement of the sleeve and the wedging members, in relation to the cam faces 8, in a locking or releasing action.

While the locking or wedging members 9 have been referred to as substantially radially-acting members, in a preferred embodiment, as shown, these elements do not move in precisely radial planes, but by reason of the location or direction of their guiding slots or sockets 10, are caused to move in non-radial planes which are substantially perpendicular to the cam faces 8, in any of the rotative positions of the spacing sleeve 11 and of the wedging members.

Fig. 1 also shows a positively acting clutch means for connecting the driven to the driving shaft, thus to eliminate the free-wheeling or overrunning action, or in some cases to provide for reverse driving. This consists, as here shown, of a shiftable clutch member 30, with a spline connection to the driving shaft, and having teeth or jaws 31 adapted to engage with similar teeth or jaw formations 32 at one end of sleeve 3.

There is thus provided a clutch which is capable of locking the driving and driven members together when it is desired to eliminate or lock out the free-wheeling action.

It is to be understood that various other changes may be made in the form, details of construction, arrangement of the parts and the uses to which they are applied, without departing from the spirit of the invention or the scope of the appended claims.

What is claimed is:

1. An overrunning clutch comprising a driving member, a driven member, rollers intermediate the members, wedging elements intermediate one of the members and the rollers, cams acting upon rotation of the driving member in one predetermined direction only to move the wedging elements substantially radially and engage them with the rollers and effect a locking action of the rollers between the wedging elements and one of said members, and means integral with the wedging elements for holding them in contact with the cams during overrunning of the driven member.

2. An overrunning clutch comprising a driving member, a driven member, a roller race on one of the members, a wedge guide relatively revoluble on the other member, wedge elements supported and guided for substantially radial movement by said guide, and rollers traveling on said race and adapted to cooperate with the wedge elements in a driving-locking action.

3. An overrunning clutch comprising a driving member, a driven member, a roller race on one of the members, a wedge guide relatively revoluble on the other member, wedge elements supported and guided for substantially radial movement by said guide, rollers traveling on said race and adapted to cooperate with the wedge elements in a driving-locking action, and a cage spacing the rollers.

4. An overrunning clutch comprising a driving member, a driven member, a roller race on one of the members, a wedge guide relatively revoluble on the other member, wedge elements supported and guided for substantially radial movement by said guide, rollers traveling on said race and adapted to cooperate with the wedge elements in a driving-locking action, and cam elements rotating with said member on which the wedge guide is revoluble and cooperating with the wedge elements.

5. An overrunning clutch comprising a driving member, a driven member, a roll race surface on one of the members, a wedge guide relatively revoluble on the other member and having a roller race surface, wedge elements supported and guided for substantially radial movement by said guide, and spaced rollers traveling between said race surfaces and adapted to cooperate with the wedge elements in a driving-locking action.

6. An overrunning clutch comprising a driving member, a driven member, a roll race surface on one of the members, a wedge guide relatively revoluble on the other member and having a roller race surface, wedge elements supported and guided for substantially radial movment by said guide, spaced rollers traveling between said race surfaces and adapted to cooperate with the wedge elements in a driving-locking action, and cam elements rotating with said member on which the wedge guide is revoluble and cooperating with the wedge elements.

7. The structure defined in claim 2 with the addition of frictional means acting between one of said members and said wedge guide, tending to move it rotarily in relation to the other one of said members.

8. The structure defined in claim 3 with the addition of frictional means acting between one of said members and said wedge guide, tending to move it rotarily in relation to the other one of said members.

9. The structure defined in claim 4 with the addition of frictional means acting between one of said members and said wedge guide, tending to move it rotarily in relation to the other one of said members.

10. A free-wheeling or overrunning clutch comprising a driving member, a driven member, cam elements on one of said members, a spacing and race sleeve revoluble on said member and having a roller race surface, a plurality of substantially radially acting wedging elements spaced and guided by said sleeve and cooperating with the cam elements and also having wedging faces, the other of said members having a roller race surface, and spaced rollers arranged to rotate on and between said race surfaces and to cooperate with the wedging faces of said wedging elements in a releasable locking action.

11. A free-wheeling or overrunning clutch comprising a driving member, a driven member, cam elements on one of said members, a spacing and race sleeve revoluble on said member and having a roller race surface, a plurality of substantially radially acting wedging elements spaced and guided by said sleeve and cooperating with the cam elements and also having wedging faces, the other of said members having a roller race surface, and spaced rollers arranged to rotate on and between said race surfaces and to cooperate with the wedging faces of said wedging elements in a releasable locking action, the wedging elements and one of said members having cooperating retaining means at times preventing radial displacement of the wedging elements by centrifugal force.

12. A free-wheeling or overrunning clutch comprising a driving member, a driven member, cam elements on one of said members, a spacing and race sleeve revoluble on said member and having a roller race surface, a plurality of substantially radially acting wedging elements spaced and guided by said sleeve and cooperating with the cam elements and also having wedging faces, the other of said members having a roller race surface, spaced rollers arranged to rotate on and between said race surfaces and to cooperate with the wedging faces of said wedging elements in a releasable locking action, and frictional means acting between one of said members and said sleeve to insure initiation of a locking or unlocking action.

13. A free-wheeling or overrunning clutch comprising a driving shaft, a driven shaft, cam elements on the driving shaft, a spacing and race sleeve revoluble on the driving shaft and having a roller race surface, a plurality of substantially radially acting wedge members spaced and guided by said sleeve and cooperating with the cam elements and also having wedging faces, the driven shaft having a roller race surface, and spaced rollers arranged to rotate on and between said race surfaces and to cooperate with the wedging faces of said wedging members in a releasable locking action.

14. A free-wheeling or overrunning clutch comprising a driving shaft, a driven shaft, cam elements on the driving shaft, a spacing and race sleeve revoluble on the driving shaft and having a roller race surface, a plurality of substantially radially acting wedging members spaced and guided by said sleeve and cooperating with the cam elements and also having wedging faces, the driven shaft having a roller race surface, and spaced rollers arranged to rotate on and between said race surfaces and to cooperate with the wedging faces of said wedging members in a releasable locking action, the wedging elements having retaining flanges and the driving member having channels to receive the flanges and prevent radial displacement of the wedging elements by centrifugal force.

15. A free-wheeling or overrunning clutch comprising a driving shaft, a driven shaft, cam elements on the driving shaft, a spacing and race sleeve revoluble on the driving shaft and having a roller race surface, a plurality of substantially radially acting wedging members spaced and guided by said sleeve and cooperating with the cam elements and also having wedging faces, the driven shaft having a roller race surface, spaced rollers arranged to rotate on and between said race surfaces and to cooperate with the wedging faces of said wedging members in a releasable locking action, and frictional means acting between the driven member and said spacing sleeve to insure initiation of a locking or unlocking action.

16. The structure defined in claim 11 with the addition that the spacing sleeve overlies and extends beyond the cam elements and its race surface has circularly uninterrupted end zones engaged by end-portions of the roller surfaces.

17. The structure defined in claim 4 with the addition that the wedge guide overlies and extends beyond the cam elements and has a roller-race surface with circularly uninterrupted end zones engaged by end-portions of the roller surfaces.

18. An overrunning clutch comprising a driving member, a driven member, rollers intermediate the members, wedging elements intermediate one of the members and the rollers, and means acting upon rotation of the driving member in one direction only to effect a locking action of the rollers between the wedging elements and one of said members, and means integral with the wedging elements for holding them in contact with said first-named means during overrunning of the driven member.

FRANCIS LINDER.